US006666786B2

(12) United States Patent
Yahata (10) Patent No.: US 6,666,786 B2
(45) Date of Patent: Dec. 23, 2003

(54) CHAMFERED SPROCKET ASSEMBLY

(75) Inventor: Yasuhiro Yahata, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/878,793

(22) Filed: Jun. 11, 2001

(65) Prior Publication Data

US 2002/0086753 A1 Jul. 4, 2002

Related U.S. Application Data

(60) Provisional application No. 60/258,863, filed on Dec. 29, 2000.

(51) Int. Cl.[7] ................................................ F16H 55/36
(52) U.S. Cl. ........................................ 474/152; 474/158
(58) Field of Search ................................ 474/152, 153, 474/154, 155, 156, 158, 174

(56) References Cited

U.S. PATENT DOCUMENTS

| 3,970,386 A | * | 7/1976 | Wohlrab ........................ 226/2 |
| 4,392,841 A | * | 7/1983 | Juy .............................. 474/156 |
| 4,867,733 A | * | 9/1989 | Yamanoi et al. ............ 474/161 |
| 5,078,653 A | | 1/1992 | Nagano |
| 5,087,226 A | | 2/1992 | Nagano |
| 5,123,878 A | | 6/1992 | Nagano |
| 5,192,249 A | | 3/1993 | Nagano |
| 5,545,096 A | * | 8/1996 | Su ............................... 474/160 |
| 6,007,442 A | | 12/1999 | Schmidt |

FOREIGN PATENT DOCUMENTS

| EP | 1121839 | * | 1/1981 | ............ B62M/9/10 |
| EP | 0 856 461 B1 | | 1/1998 | |

* cited by examiner

Primary Examiner—Thomas R. Hannon
Assistant Examiner—Vicky A. Johnson
(74) Attorney, Agent, or Firm—Jeffer, Mangels, Butler & Marmaro LLP (57) ABSTRACT

A chamfered sprocket assembly for facilitating the shifting of a drive chain from a larger sprocket to a smaller sprocket is disclosed. In a preferred embodiment, the chamfered sprocket assembly includes a sprocket having a plurality of chamfered portions on a side facing a smaller sprocket, each chamfered portion located between a pair of toothlike projections located on the rim of the sprocket body. The chamfered portions preferably include a crest which tapers toward a first edge and a second edge of the chamfer portion, respectively. The crest is preferably offset from the center of the chamfer portion toward the driving direction of the sprocket assembly. To further facilitate the shifting of the drive chain, the sprocket preferably includes a rounded shoulder to guide the movement of the drive chain. Finally, the friction between the toothlike projections and the drive chain is reduced by polishing the toothlike projections.

14 Claims, 12 Drawing Sheets

*PRIOR ART*

FIG. 1a

*PRIOR ART*

FIG. 1b

*PRIOR ART*

CHAMFERED SPROCKET ASSEMBLY

This application claims the benefit of Provisional Application No. 50/258,863, file Dec. 29, 2000.

FIELD OF THE INVENTION

The present invention relates to a multi-stage sprocket assembly for a bicycle and more particularly to a multi-stage sprocket assembly having chamfered sprockets configured to facilitate the shifting of a drive chain from a larger sprocket to a smaller sprocket.

BACKGROUND OF THE INVENTION

According to a conventional multi-sprocket assembly, the large sprocket of the assembly includes a disengagement-facilitating means for facilitating disengagement of the drive chain from teeth of the large sprocket when the drive chain is shifted from the large sprocket to the small sprocket to change a driving speed of the bicycle. Specifically, the disengagement means comprises reduction in the height of some of the teeth of the large sprocket relative to the other teeth in order to facilitate the chain disengagement at the specified portion of the large sprocket.

Various features have been added to the traditional multi-sprocket assembly to ensure smooth and reliable chain shift action from the large sprocket to the small sprocket. For example, according to a conventional multi-stage sprocket assembly, the large sprocket has, in its face facing the small sprocket, a concavity to form a stepped portion for receiving the shifting drive chain when the chain is shifted from the large sprocket to the small sprocket disposed adjacent thereto. Specifically, the stepped portion is provided at a position higher than the dedendum of the teeth of the large sprocket so as to avoid locking of the shifting chain segment to the large sprocket.

Figure 1A:
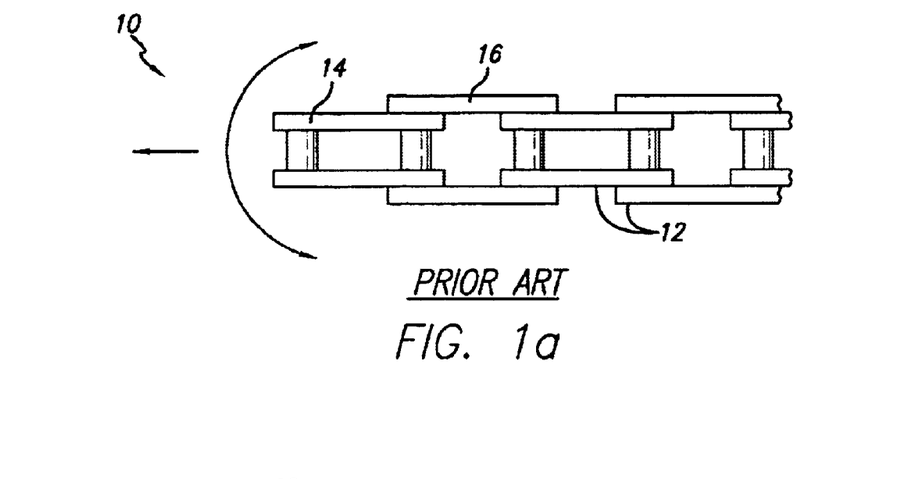
Figure 1B:
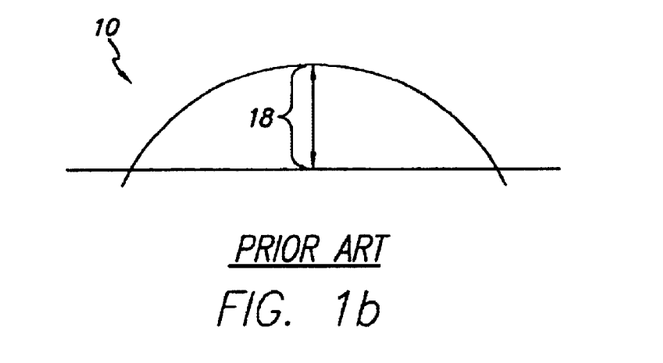
FIG. 1b depicts the arc bend of a typical, clean drive chain used with a sprocket assembly.
Figure 1C:
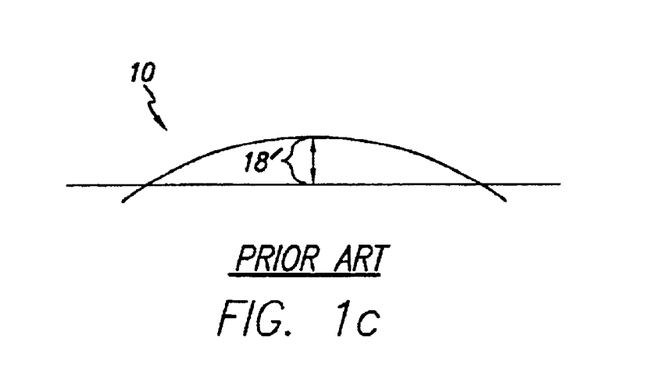
FIG. 1c depicts the arc bend of a typical drive chain that has been stiffened by the accumulation of mud and dirt particles in the links of the drive chain.

The problems with the chain shift action is exacerbated by environmental conditions, such as mud and dirt, which can collect in the drive chain links and in the stepped portions of the sprocket assembly. FIG. 1a depicts a typical drive chain 10 having a plurality of links 12, wherein each link includes an inner plate 14 and an outer plate 16. As shown in FIG. 1b, when a typical new, clean drive chain 10 is bent, the drive chain has a bending arc 18 of approximately 300 mm. However, when there is shifting in mud or dirt, particles gather in the links of the drive chain. As a result of the fine mud and dirt particles settling into the links 12 of the drive chain 10, the drive chain becomes stiff and the bending arc 18 decreases in height. FIG. 1c depicts a drive chain that has been stiffened due to the settling of mud and dirt particles in the links 12 of the drive chain 10. As shown in FIG. 1c, the bending arc 18' has decreased to 100 mm, significantly less than the bending arc 18 of a new, clean drive chain. When the drive chain is in a stiffened condition, the occurrence of chain jamming incidents significantly increases.

Accordingly, it is desirable to provide a multi-stage sprocket assembly for a bicycle that offers smooth and reliable chain shift action from the large sprocket to the small sprocket even in inclement conditions, such as mud or dirt.

SUMMARY OF THE PREFERRED EMBODIMENTS

The present invention overcomes the disadvantages of the prior art. A chamfered sprocket assembly for facilitating the shifting of a drive chain from a larger sprocket to a smaller sprocket is disclosed. In a preferred embodiment of the invention, the chamfered sprocket assembly includes a sprocket having a plurality of chamfered portions on a side face facing a smaller sprocket, each chamfered portion located between a pair of toothlike projections located on the rim of the sprocket body. Each of the chamfered portions preferably include a crest which tapers toward a first edge and a second edge of the chamfer portion, respectively. The crest is preferably offset from the center of the chamfer portion toward the driving direction of the sprocket assembly. If there are more than two sprockets in the sprocket assembly, the intermediate sprockets also have chamfered portions to facilitate the smooth transition of the drive chain from one sprocket to another.

To further facilitate the shifting of the drive chain, the sprocket preferably includes a rounded shoulder to guide the movement of the drive chain. Finally, the friction between the toothlike projections and the drive chain is reduced by polishing the toothlike projections.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 1c depicts te arc bend of a typical drive chain that has been stiffened by the accumulation of mud and dirt particles in the links of the drive chain;

Like numerals refer to like parts throughout the several views of the drawings.

DETAILED DESCRIPTION OF THE PREFERRED EMBODIMENTS

Preferred embodiments of a chamfered sprocket assembly for a bicycle relating to the present invention will now be described in particular with reference to the accompanying drawings.

Figure 10:
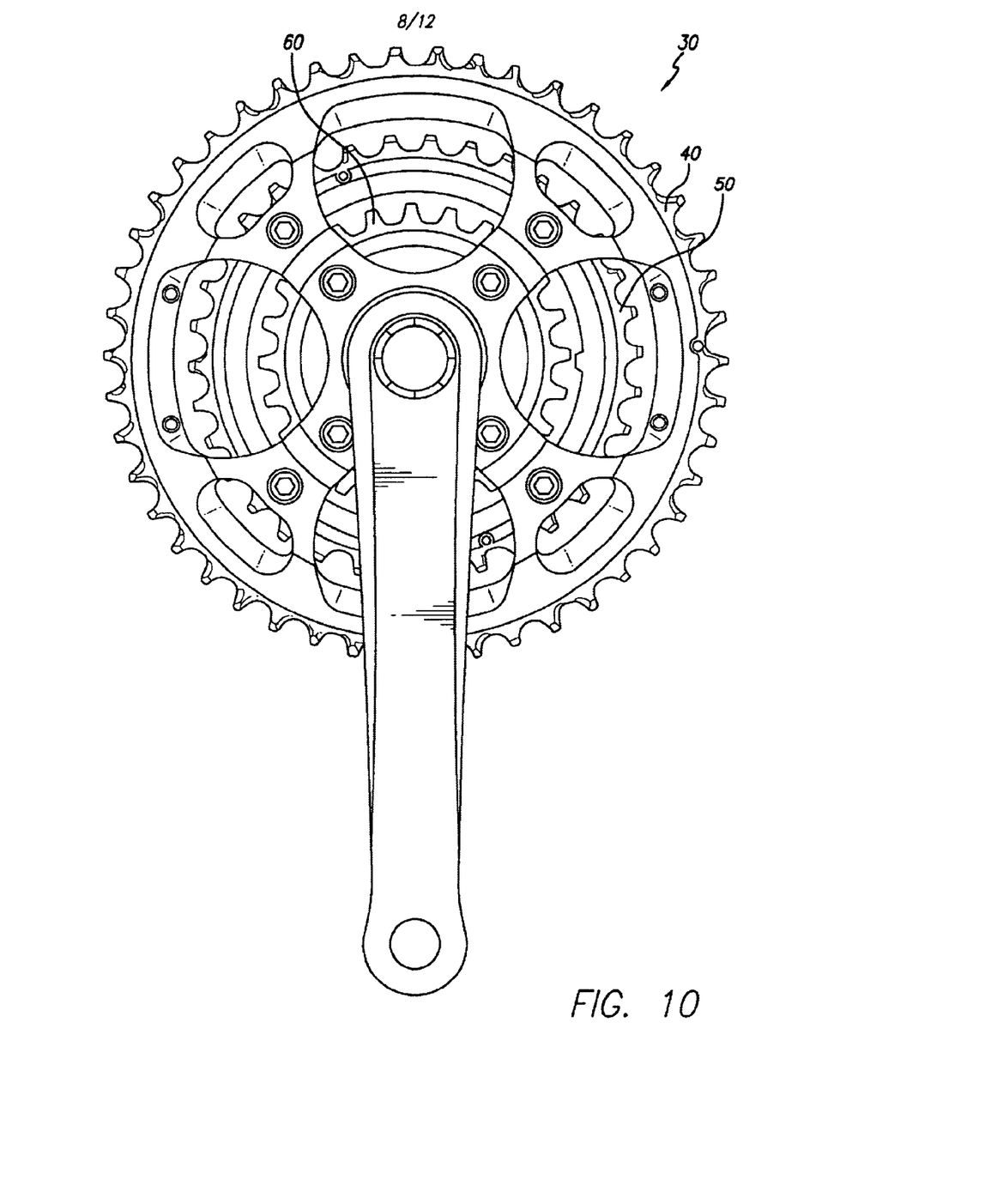
FIG. 10 is a front view of a preferred embodiment of a chainwheel of the present invention.
Figure 11:
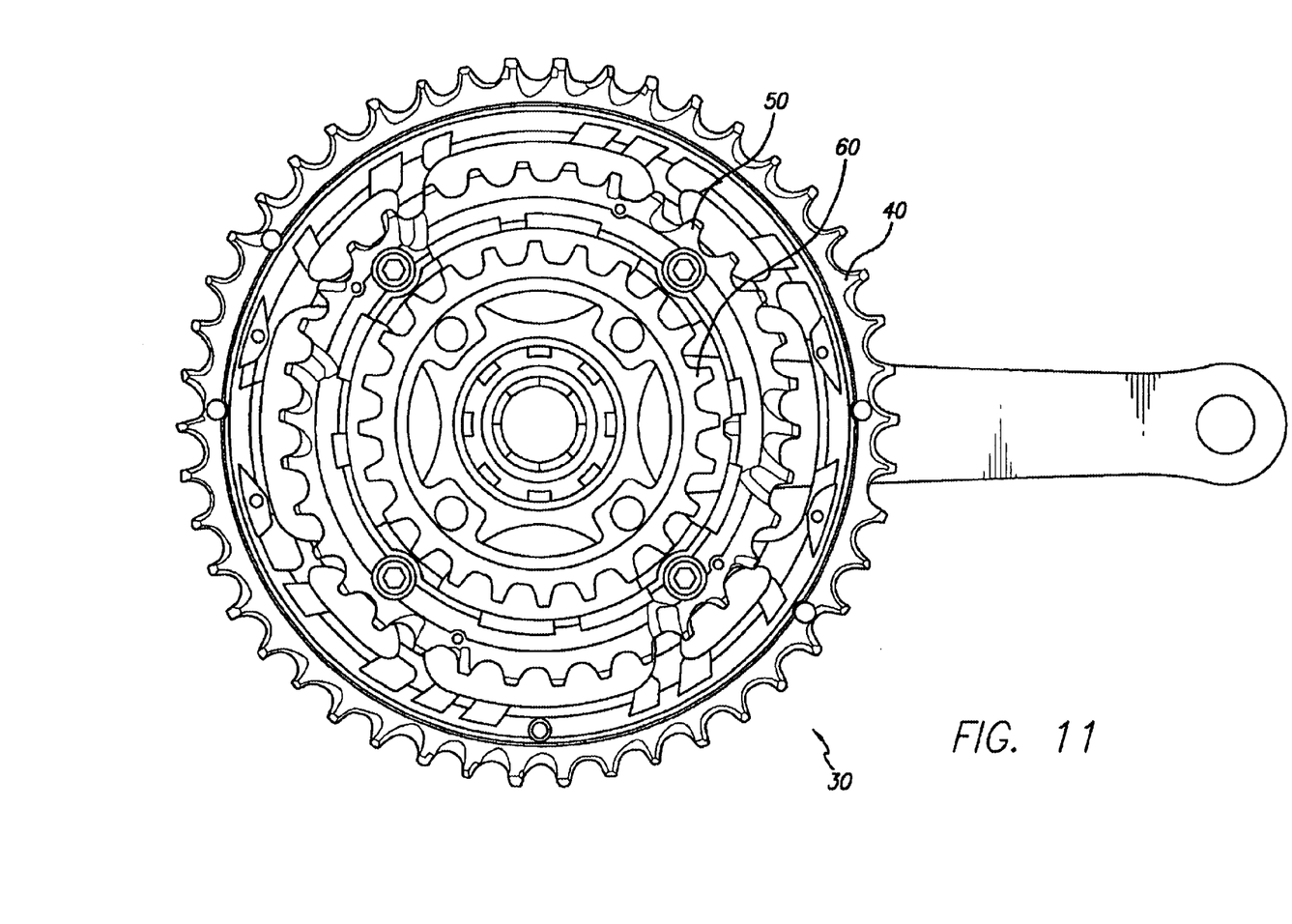
FIG. 11 is a back view of a preferred embodiment of a chainwheel of the present invention.

As shown in FIGS. 10 and 11, in a preferred embodiment of the present invention, the bicycle chainwheel 30 includes a larger sprocket 40, a smaller sprocket 50 and a smallest sprocket 60. The sprockets are preferably arranged such that the smaller sprocket 50 is positioned between the larger sprocket 40 and smallest sprocket 60. The sprockets 40, 50, 60 are configured and arranged to facilitate the shifting of a drive chain (not shown) from one sprocket to another during the gear shifting of a bicycle. The chainwheel may be configured with fewer or additional sprockets without departing from the inventive concepts disclosed herein. For example, in one embodiment of the invention, the chainwheel includes a larger sprocket and the smallest sprocket, eliminating the intermediate "smaller" sprocket. In a preferred embodiment of the invention, the larger sprocket 40 has forty-six (46) toothlike projections, the smaller sprocket has thirty-four (34) toothlike projections, and the smallest sprocket has twenty-four (24) toothlike projections. The number of toothlike projections on each sprocket may vary without departing from the inventive concept disclosed herein. The toothlike projections of the sprockets are phase-arranged to facilitate the smooth movement of the drive chain from one sprocket to another.

Figure 2:
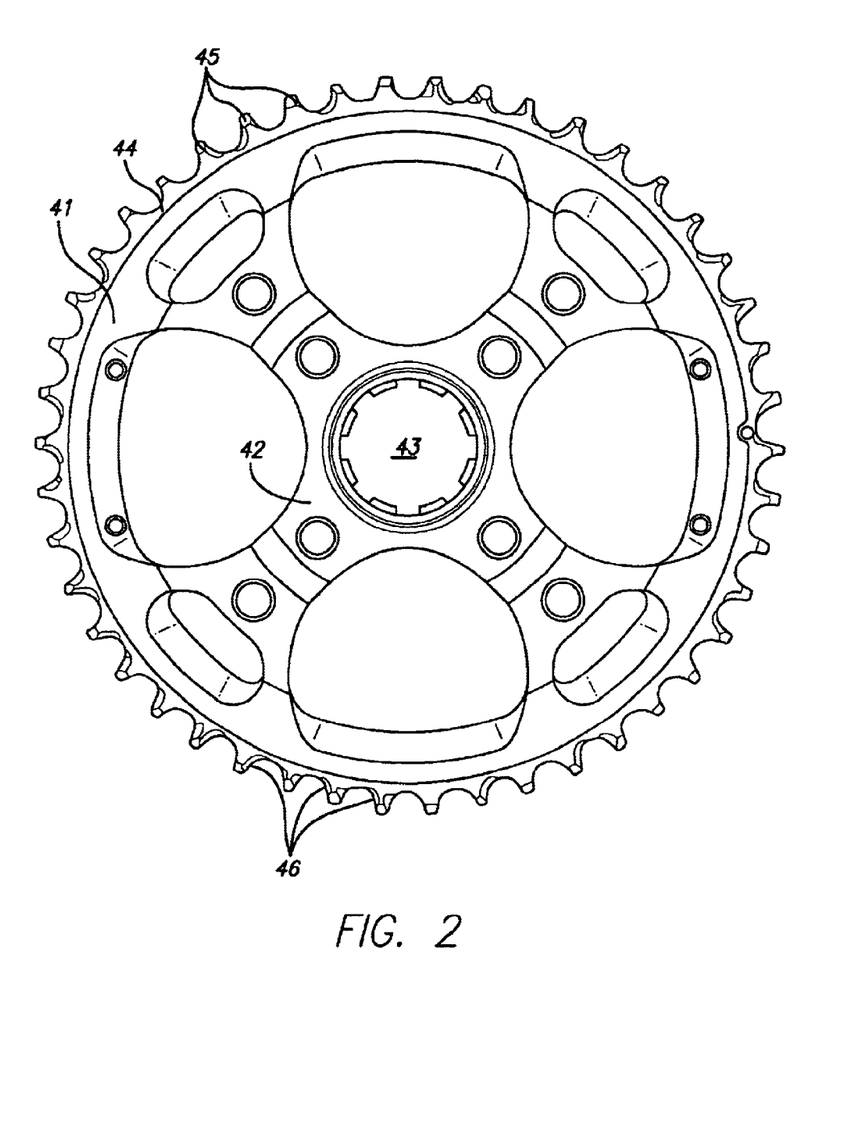
FIG. 2 is a front view of a preferred embodiment of the large sprocket of the present invention having small chamfered portions between the teeth.

FIGS. 2 through 6 depict a preferred embodiment of the larger sprocket 40 of the present invention. As shown in FIG. 2, the front side 41 of the larger sprocket includes a sprocket body 42, having a center 43, and sprocket rim 44 around the periphery thereof. A plurality of toothlike projections 45 are arranged on the rim 44 of the body 42 and configured to engage the drive chain (not shown). The region between each pair of toothlike projections 45 is preferably beveled, defining a chamfered portion 46. The chamfered portion 46 preferably extends from the rim 44 of the sprocket body 42 toward the center 43 of the sprocket body 42. In a preferred embodiment of the invention, the larger sprocket 40 includes a chamfered portion 46 between each pair of toothlike projections 45 on the front side 41 of the larger sprocket 40.

Figure 3:
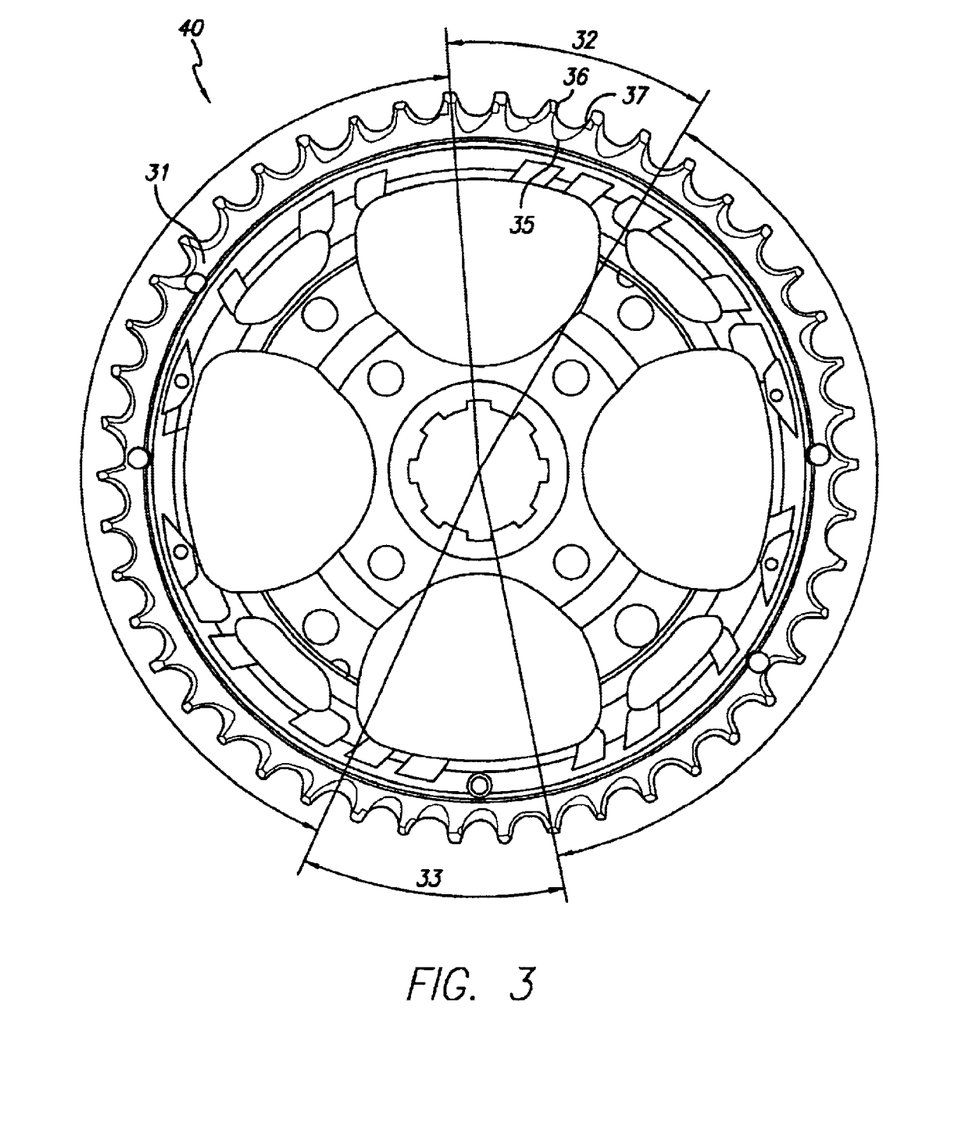
FIG. 3 is a back view of a preferred embodiment of the large sprocket of the present invention having large chamfered portions.

As shown in FIG. 3, the back side 31 of the larger sprocket 40 includes a first and second disengagement-facilitating portions 32, 33 for facilitating the disengagement of a drive chain at this predetermined portion when the chain is shifted from the larger sprocket 40 to the smaller sprocket 50. The disengagement-facilitating portions are provided at two peripheral positions of the larger sprocket 40 with 180 degree displacement therebetween. The disengagement-facilitating portions are chosen to provide an optimal location for a chain shift because bicycle-driving torque applied to the crank device is minimum at that position.

To facilitate the disengagement of the chain from the larger sprocket 40 and the shift of the drive chain to the smaller sprocket 50, one or more of the toothlike projections 45 in the disengagement-facilitating portions 32, 33 have a shorter tooth height than all of the other toothlike projections of the larger sprocket 40. In a more preferred embodiment, the disengagement-facilitating portions 32, 33 include a plurality of teeth, each having a progressively shorter tooth height than the adjacent tooth.

To further facilitate the disengagement of the drive chain from the larger sprocket 40 and to the smaller sprocket 50, the back side 31 of the larger sprocket 40 preferably includes chamfered portions 34 between each pair of toothlike projections 45 within the disengagement-facilitating portions 32, 33. The chamfered portions 34 on the back side 31 of the larger sprocket 40 are preferably larger than the chamfered portions 46 on the front side 41 of the larger sprocket 40. In a more preferred embodiment of the present invention, the back side 31 of the larger sprocket 40 also includes smaller chamfered portions 46 outside of the disengagement-facilitating portions 32, 33. Accordingly, smaller chamfered portions 46 are provided on the back side 31 of the larger sprocket 40 between each pair of toothlike projection on the rim, other than the disengagement-facilitating portions 32, 33 of the sprocket 40.

In the disengagement-facilitating portions 32, 33, each of the chamfered portions 34 on the back side 31 of the larger sprocket 40 includes a crest 35, a first edge 36 and a second edge 37 and each of the chamfered portions 34 preferably tapers from the crest 35 toward each of the first edge 36 and the second edge 37, respectively.

Figure 4:
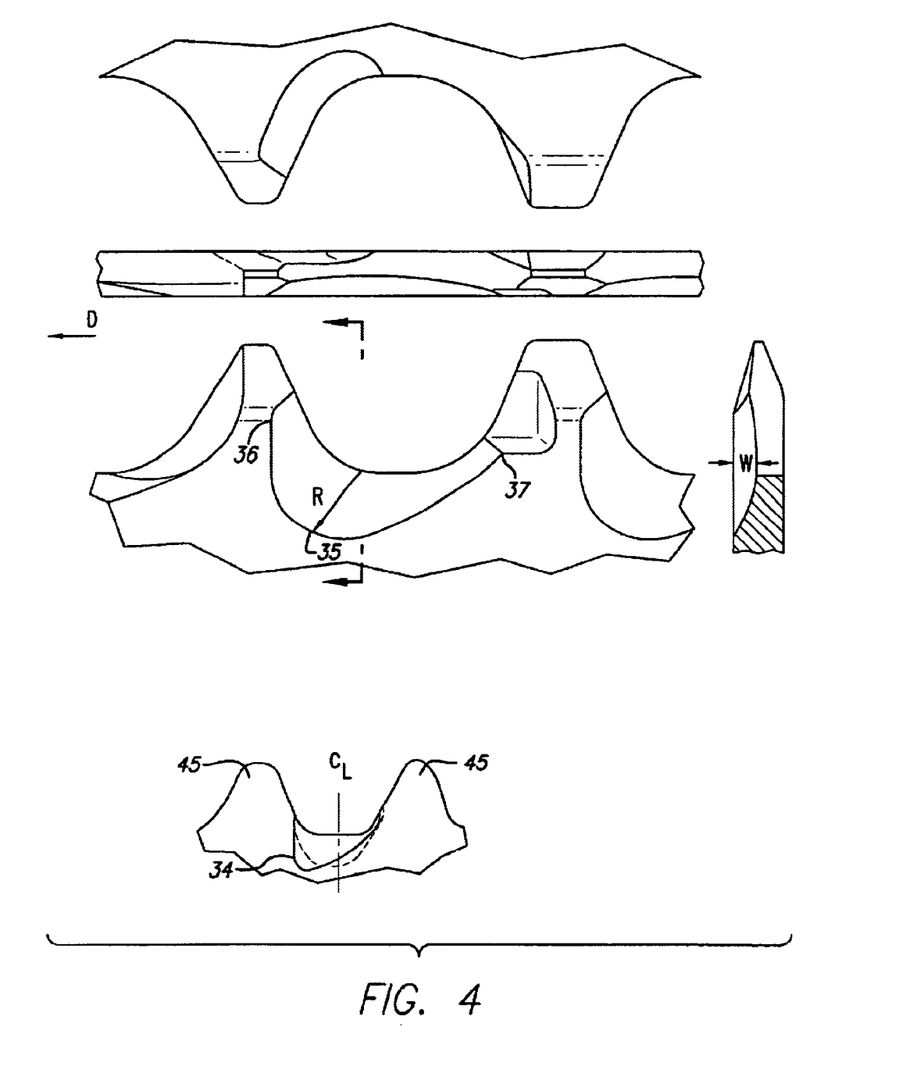
FIG. 4 depicts various views of the large chamfered portion of a preferred embodiment of the sprocket of the present invention.
Figure 5:
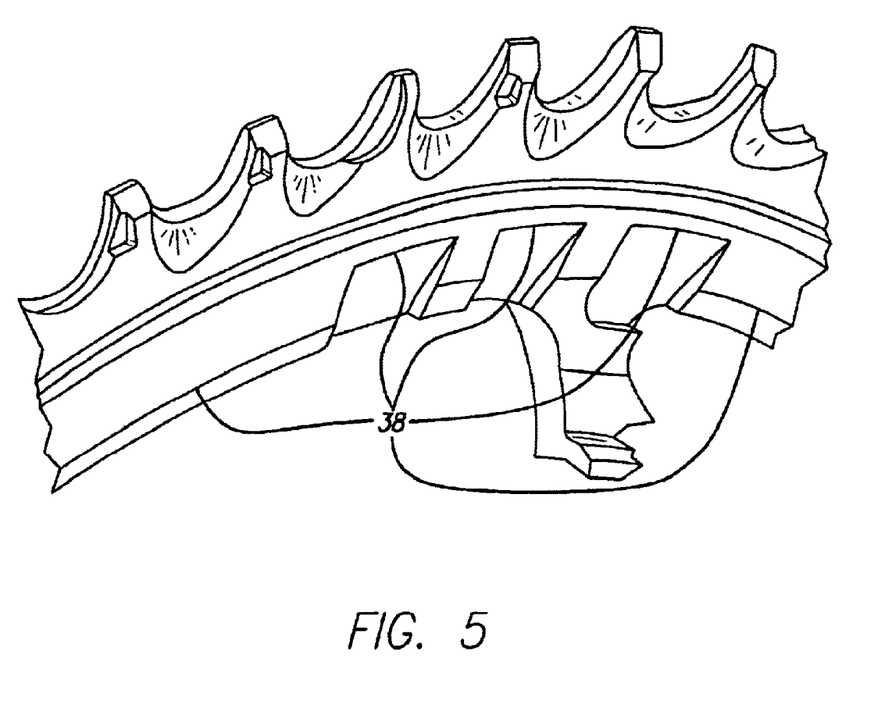
FIG. 5 is a perspective view of a portion of a preferred embodiment of the sprocket of the present invention having chamfered portions.

As best shown in FIG. 4, the crest 35 of the chamfered portion 34 is preferably offset from the center line $C_L$ of the chamfered portion 34 toward the driving direction D of the larger sprocket 40. In a preferred embodiment of the invention, the radius of curvature, R, of the crest 35 of the chamfered portion 34 measures in the range of about 1.5 mm to 3.0 mm and the width, W, of the chamfered portion 34 measures about 0.6 mm.

Figure 6:
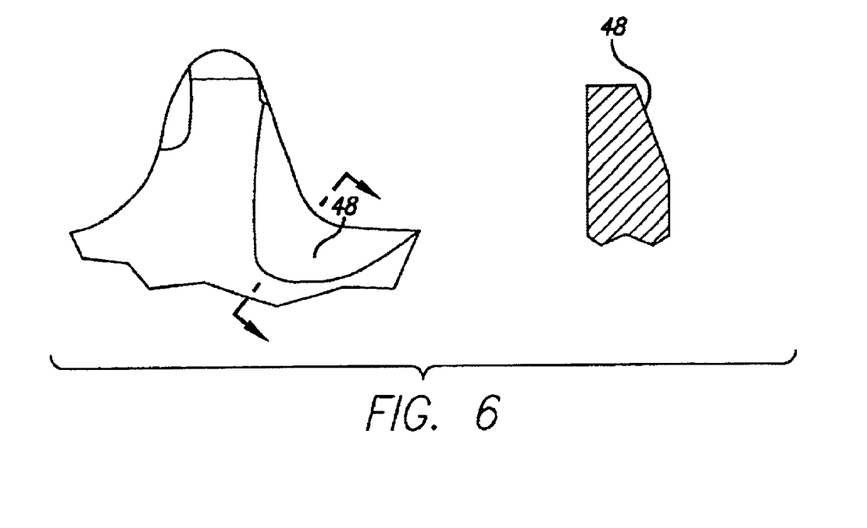
FIG. 6 is cross-sectional view of the chamfered portion of a preferred embodiment of the present invention.
Figure 7:
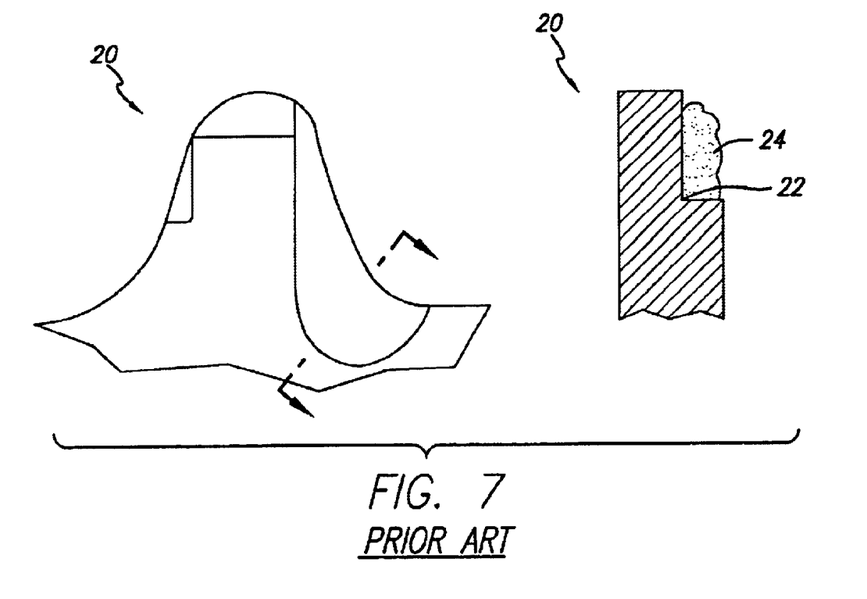
FIG. 7 is a cross-sectional view of a stepped portion of a known sprocket assembly.

FIGS. 6 and 7 illustrate one of the differences between known sprockets and the present invention. As shown in FIG. 7, a known sprocket 20 includes a stepped portion 22 configured to receive the drive chain and facilitate the shift of the drive chain from one sprocket to another. A disadvantage of the known sprocket design is that mud and dirt particles 24 can accumulate in the stepped portion 22, thus interfering with the shifting of the drive chain. As shown in FIG. 6, the present invention overcomes the disadvantage of the known sprocket 20 by providing a chamfered portion 48 that does not accumulate mud or dirt particles. The chamfered portion 48 is preferably continuous and does not include sharp edges that are conducive to accumulating unwanted particles. The configuration of the chamfered portion 48 allows any dirt or mud particles to slide off of the sprocket, keeping the sprocket, the toothlike projections, and ultimately, the drive chain free of mud and dirt particles.

To further facilitate the movement of the drive chain from the larger sprocket 40 to the smaller sprocket 50, the larger sprocket 40 includes a shoulder 38 on the back side 31 of the larger sprocket 40. The shoulder 38 is preferably smoothened to create a continuously rounded shoulder, such that no sharp edges exist. In a preferred embodiment of the invention, the shoulder 38 can be smoothened by grinding off the surface of the back side of the larger sprocket to create a rounded shoulder.

Figure 8:
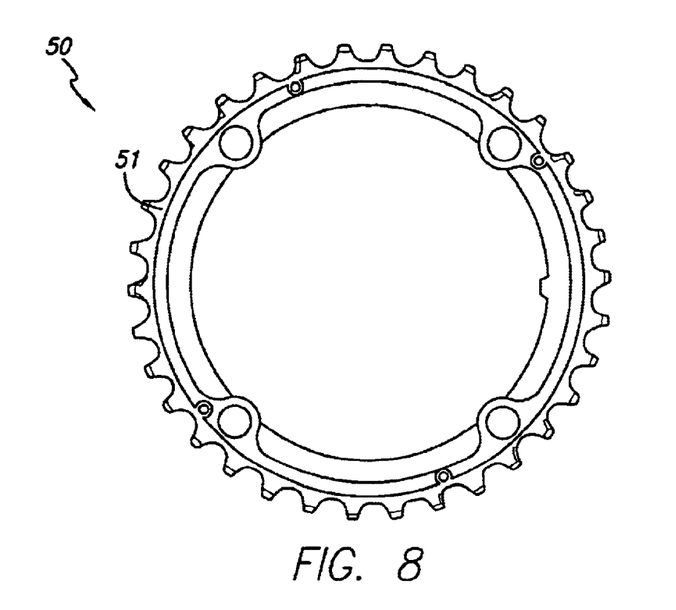
FIG. 8 is a front view of a preferred embodiment of another sprocket of the present invention.
Figure 9:
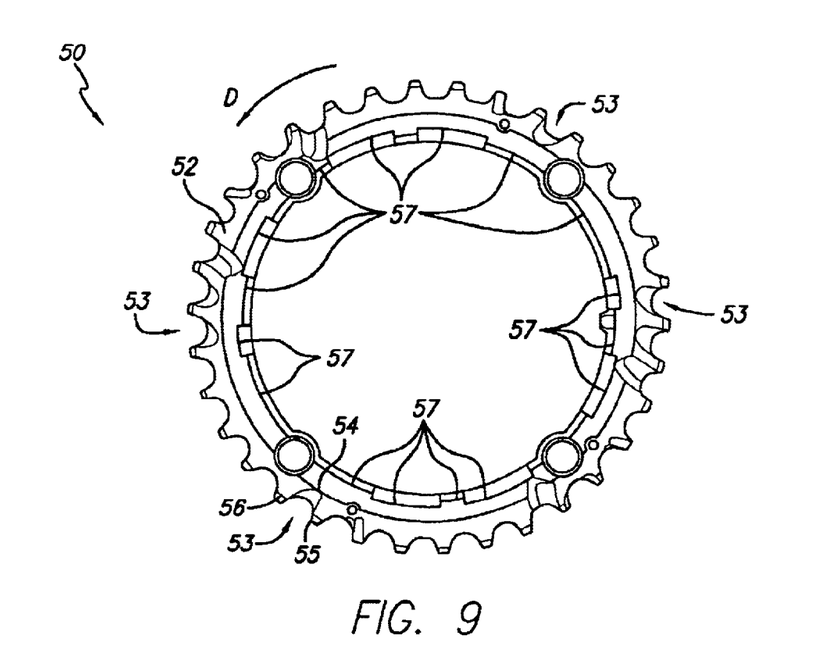
FIG. 9 is a back view of a preferred embodiment of another sprocket of the present invention.

In a preferred embodiment of the invention, the drive chain is shifted from the larger sprocket 40 to the smaller sprocket 50 to the smallest sprocket 60. The sprockets are preferably arranged such that the back side of the larger sprocket 40 faces the front side of the smaller sprocket 50, and the back side of the smaller sprocket 50 faces the front side of the smallest sprocket 60. FIGS. 8 and 9 depict the front and back side, respectively, of the smaller sprocket 50. As shown in FIG. 8, the front side 51 of the smaller sprocket preferably does not include any chamfered portions like the chamfered portions on the large sprockets. As shown in FIG. 9, the back side 52 of the smaller sprocket 50 includes a plurality of chamfered portions 53 configured to facilitate the shifting of the drive chain from the smaller sprocket 50 to the smallest sprocket 60. The chamfered portions 53 on the back side 52 of the smaller sprocket 50 are preferably identical to the chamfered portions 34 on the back side 31 of the larger sprocket 40. Namely, each of the chamfered portions 53 on the back side 52 of the smaller sprocket 50 includes a crest 54, a first edge 55 and a second edge 56. Each of the chamfered portions 53 preferably tapers from the crest 54 toward each of the first edge 55 and the second edge 56, respectively. Furthermore, the crest 54 of the chamfered portion 53 is preferably offset from the center line of the chamfered portion 53 toward the driving direction D of the smaller sprocket 50.

To further facilitate the disengagement of the drive chain from the smaller sprocket 50 and the movement of the drive chain to the smallest sprocket 60, the smaller sprocket 50 includes a shoulder 57 on the back side 52 of the smaller sprocket 50, facing the smallest sprocket 60. The shoulder 57 is preferably smoothened to create a continuously rounded shoulder, such that no sharp edges exist. In a preferred embodiment of the invention, the shoulder 57 can be smoothened by grinding off the surface of the back side of the larger sprocket to create a rounded shoulder.

Figure 12:
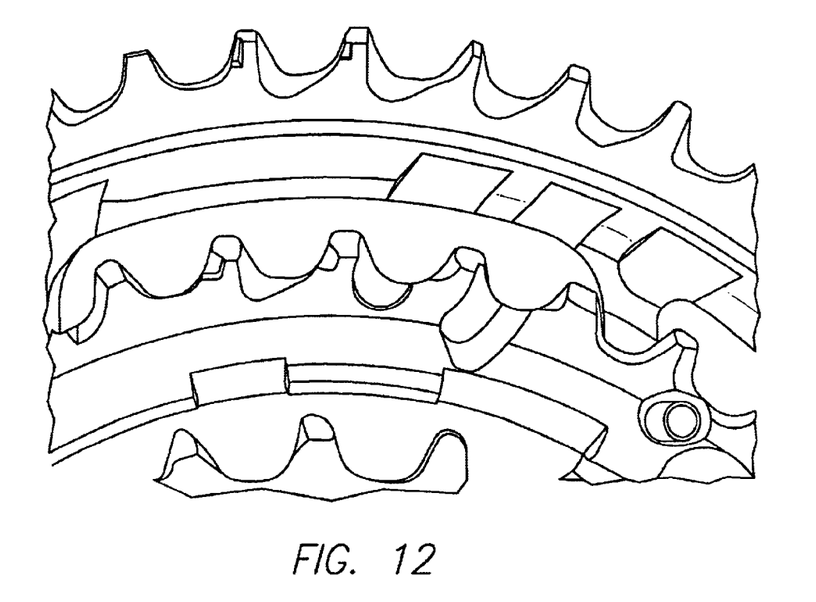
FIG. 12 is a partial view of a preferred embodiment of a chainwheel of the present invention depicting chamfered portions on the larger and smaller sprockets.

FIG. 12 shows the back side of the larger sprocket 40, the smaller sprocket 50 and the smallest sprocket 60. As shown in FIG. 12, the larger sprocket 40 and smaller sprocket 50 include chamfered portions for facilitating the disengagement of the drive chain and the movement of the chain from the larger sprocket 40 to the smaller sprocket 50, and from the smaller sprocket 50 to the smallest sprocket 60.

Figure 13:
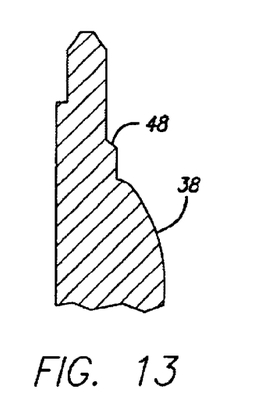
FIG. 13 is a cross-sectional view of a preferred embodiment of the sprocket of the present invention having a chamfered portion and continuous shoulder.
Figure 14:
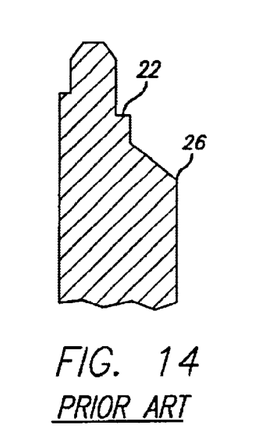
FIG. 14 is a cross-section view of a known sprocket having a stepped portion and a sharp-edged shoulder.

FIGS. 13 and 14 illustrates some of the differences between the known sprockets 20 and the sprockets of the present invention. As shown in FIG. 14, a known sprocket includes a stepped portion 22 and a sharp-edged shoulder 26. In contrast, as shown in FIG. 13, the sprocket of the present invention provides a chamfered portion 48 that does not accumulate mud or dirt particles and a smooth, continuous shoulder 38 that facilitates the movement of the drive chain from one sprocket to another. In a preferred embodiment of the invention, the toothlike projections have a thickness, t, of about 1.8 mm, which is smaller than the thickness of the known sprocket teeth.

Figure 15A:
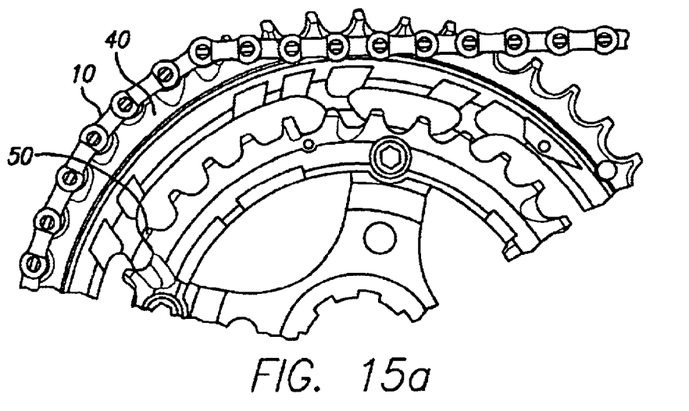
FIGS. 15a–c is a back view of the progressive shifting of the drive chain from a larger sprocket to a smaller sprocket of a preferred embodiment of the present invention.
Figure 15B:
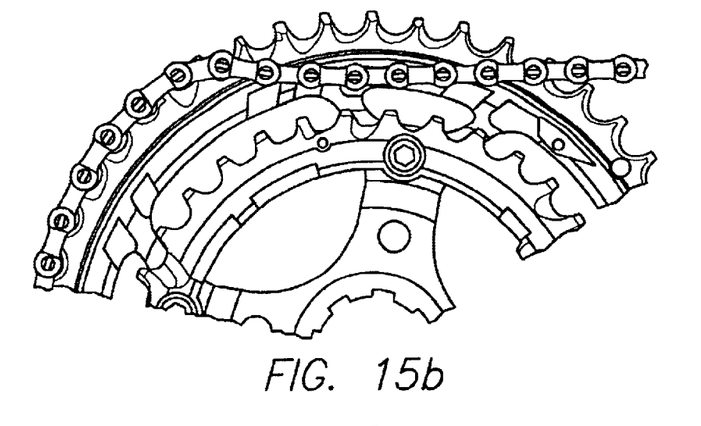
Figure 15C:
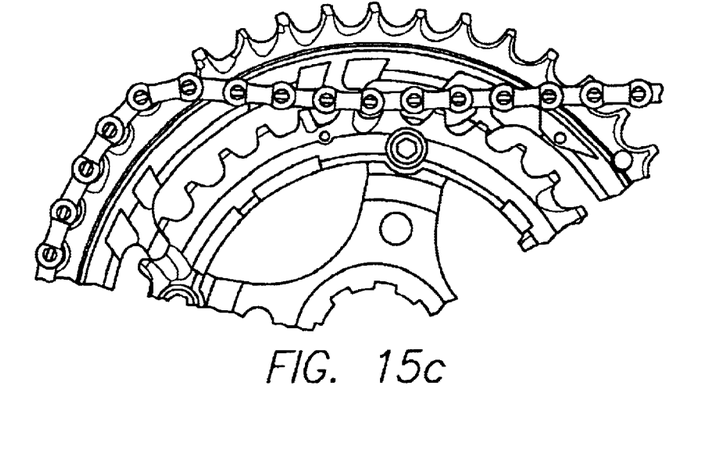
Figure 16A:
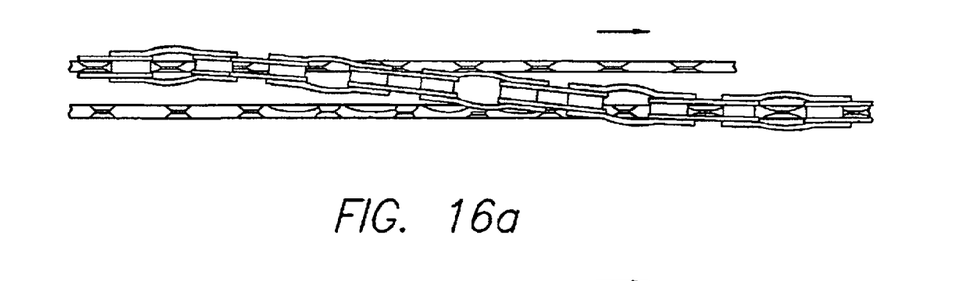
FIGS. 16a–c is a top view of the progressive shifting of the drive chain from a larger sprocket to a smaller sprocket of a preferred embodiment of the present invention.
Figure 16B:
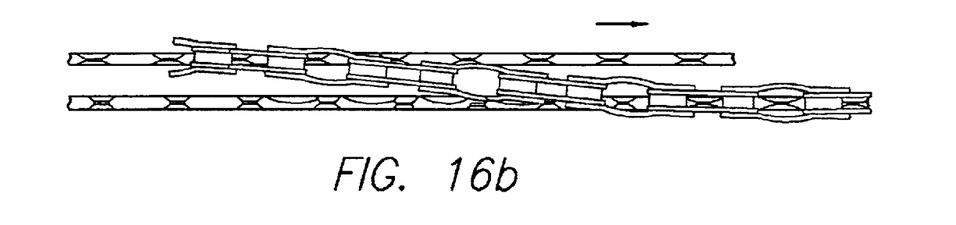
Figure 16C:
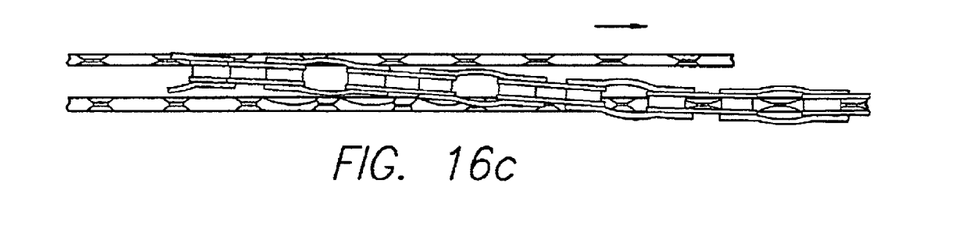
Figure 17:
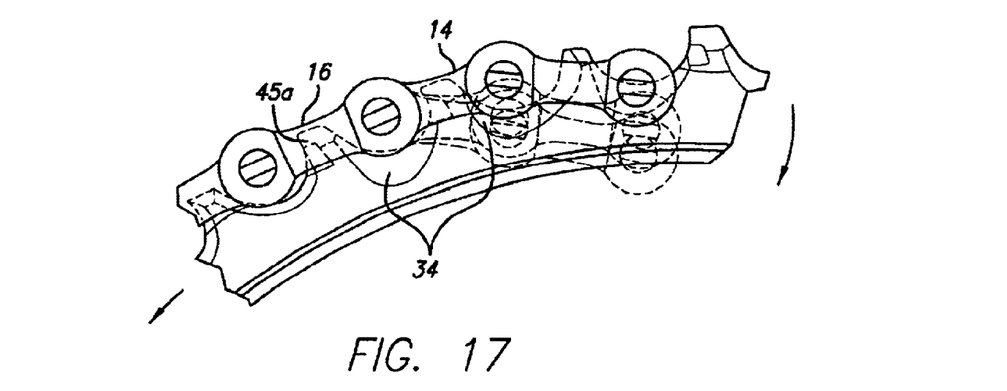
FIG. 17 is an enlarged view of the chain and sprocket assembly depicting the motion of the drive chain.

FIGS. 15 through 17 illustrate the disengagement of the drive chain 10 from the larger sprocket 40 and the movement of the drive chain from a larger sprocket 40 to the smaller sprocket 50. The function of the chamfered portions 34, 48 in the course of a change-speed shifting operation of the drive chain 10 will be particularly described. The drive chain 10 employed in this particular embodiment, is a roller chain consisting of two kinds of link plates, i.e. inner plates 14 and outer plates 16 pivotably and alternately connected to each other.

With reference to FIGS. 15a–15c and 16a–16c, with a rider's operation of an unillustrated derailleur, the drive chain 10 currently engaging the larger sprocket 40 is laterally displaced toward the smaller sprocket 50. The chamfered portions 34, 48 of the larger sprocket 40 and the smaller sprocket 50 facilitate the motion of the drive chain 10 by not accumulating dirt or mud thereon and by guiding the motion of the drive chain 10 toward the adjacent sprocket.

As best shown in FIG. 17, the outer plate 16 of the drive chain 10 rides over the first tooth 45a and the subsequent inner plate 14 moves toward the smaller sprocket 50. In this condition, the chain 10 is laterally flexed and with further rotation of chainwheel 30, the chain 10 moves in a downward direction. The chamfered portions 34 guide the motion of the chain 10 and ensure a smooth transition to the smaller sprocket 50.

In a preferred embodiment of the invention, to further improve the motion of the chain 10 from one sprocket to another, the toothlike projections on the sprockets are polished. The polishing is preferably accomplished using a buffing material and a polishing paste. The toothlike projections on the sprockets are preferably polished on the until any machining grooves on the surface of the tooth disappears by polishing the tooth surface, the friction on the toothlike projection and the drive chain is reduced.

There has been described hereinabove an exemplary embodiment of a chamfered sprocket assembly according to the principles of the present invention. Those skilled in the art may now make numerous uses of, and departures from, the above-described embodiment without departing from the inventive concepts disclosed herein. Accordingly, the present invention is to be defined solely by the scope of the following claims.

What is claimed is:

1. A sprocket for engagement with a chain, the sprocket comprising:
   a sprocket body having a center, a first side, and a rim on the outside periphery thereof,
   a plurality of toothlike projections arranged on the rim of the sprocket body to engage the chain;
   wherein the first side of the sprocket body includes a chamfer portion between the toothlike projections, the chamfer portion extending from the rim in a direction toward the center of the sprocket body, wherein the chamfer portion includes a crest offset from a center of the chamfer portion, a first edge and a second edge, wherein the chamfer portion tapers from the crest to the first edge and the second edge, respectively,
   wherein the sprocket has a driving direction and the crest of the chamfer is offset towards the driving direction.

2. A sprocket in accordance with claim 1 wherein the chamfer portion has a radius of curvature at the crest in the range of 1.5 to 3.0 millimeters.

3. A sprocket in accordance with claim 1 further comprising a shoulder on the sprocket body, wherein the shoulder is rounded.

4. A sprocket in accordance with claim 1 further comprising a second side having a plurality of chamfer portions, each chamfer portion adjacent one of the toothlike projections.

5. A sprocket in accordance with claim 1 wherein the tooth-like projections are polished.

6. A sprocket for engagement with a chain, the sprocket comprising:
- a sprocket body having a center, a first side, a second side and a rim on the outside periphery thereof;
- a plurality of toothlike projections arranged on the rim of the sprocket body to engage the chain; and
- wherein the first side and second side of the sprocket body each include a chamfer portion between the toothlike projections, the chamfer portion extending from the rim in a direction toward the center of the sprocket body,
- wherein the chamfer portions on the second side of the sprocket body are smaller than the chamfer portions on the first side of the sprocket body.

7. A chainwheel assembly comprising:
- a large sprocket having a sprocket body with a center, a first side, and a rim on the outside periphery thereof, a plurality of toothlike projections arranged on the rim of the sprocket body to engage the chain, wherein the first side of the sprocket body includes a chamfer portion between the toothlike projections, the chamfer portion extending from the rim in a direction toward the center of the sprocket body; and
- a smaller sprocket having a first side and a second side, wherein the second side of the smaller sprocket faces the first side of the larger sprocket and the first side of the smaller sprocket faces away from the first side of the larger sprocket,
- wherein each of the chamfer portion of the larger sprocket and the smaller sprocket includes a crest offset from a center of the chamfer portion, a first edge and a second edge, and wherein each of the chamfer portions tapers from the crest to the first edge and the second edge, respectively; and
- wherein each of the larger and the smaller sprockets has a driving direction and the crest of the chamfer portion of each of the sprockets is offset towards the driving direction.

8. A chainwheel assembly in accordance with claim 7 wherein each of the chamfer portions has a radius of curvature at the crest in the range of 1.5 to 3.0 millimeters.

9. A chainwheel assembly in accordance with claim 7 further comprising a shoulder on the sprocket body, wherein the shoulder is rounded.

10. A chainwheel assembly in accordance with claim 7 further comprising a shoulder on the sprocket body of the smaller sprocket, wherein the shoulder is rounded.

11. A chainwheel assembly in accordance with claim 7 further comprising a second side having a plurality of chamfer portions, each chamfer portion adjacent one of the toothlike projections.

12. A chainwheel assembly comprising:
- a large sprocket having a sprocket body with a center, a first side, a second side and a rim on the outside periphery thereof, a plurality of toothlike projections arranged on the rim of the sprocket body to engage the chain, wherein the first side and the second side of the sprocket body each includes a chamfer portion between the toothlike projections, the chamfer portion extending from the rim in a direction toward the center of the sprocket body, wherein each of the chamfer portions on the second side of the sprocket body are smaller than the chamfer portions on the first side of the sprocket body; and
- a smaller sprocket having a first side and a second side, wherein the second side of the smaller sprocket faces the first side of the larger sprocket and the first side of the smaller sprocket faces away from the first side of the larger sprocket.

13. A chainwheel assembly in accordance with claim 12 wherein the tooth-like projections are polished.

14. A sprocket for engagement with a chain, the sprocket comprising:
- a sprocket body having a center, a first side, and a rim on the outside periphery thereof;
- a plurality of toothlike projections arranged on the rim of the sprocket body to engage the chain;
- a plurality of chamfered portions, each chamfered portion located between one of the toothlike projections and an adjacent toothlike projection;
- a disengagement-facilitating portion of the sprocket including at least one of the plurality of toothlike projections and at least one of the chamfered portions;
- wherein the chamfered portions outside of the disengagement-facilitating portion are smaller than the chamfered portions within the disengagement-facilitating portion.

* * * * *